(12) United States Patent
Sugimoto et al.

(10) Patent No.: US 8,490,732 B2
(45) Date of Patent: Jul. 23, 2013

(54) ELECTRIC WHEELED APPARATUS POWERED BY BATTERY PACKS

(75) Inventors: Manabu Sugimoto, Anjo (JP);
Ryunosuke Kumagai, Anjo (JP);
Kenichi Kawai, Anjo (JP)

(73) Assignee: Makita Corporation, Anjo (JP)

(*) Notice: Subject to any disclaimer, the term of this patent is extended or adjusted under 35 U.S.C. 154(b) by 71 days.

(21) Appl. No.: 13/094,238

(22) Filed: Apr. 26, 2011

(65) Prior Publication Data
US 2011/0272203 A1 Nov. 10, 2011

(30) Foreign Application Priority Data
May 10, 2010 (JP) .................................. 2010-108484

(51) Int. Cl.
*B62M 6/40* (2010.01)

(52) U.S. Cl.
USPC ............... 180/206.1; 180/206.5; 180/207.3; 180/220; 180/65.27

(58) Field of Classification Search
USPC ........ 280/206.1, 220, 206.5, 207.3; 180/206.1, 180/220, 206.5, 207.3, 65.27
See application file for complete search history.

(56) References Cited

U.S. PATENT DOCUMENTS

| | | | | |
|---|---|---|---|---|
| 3,921,745 A | * | 11/1975 | McCulloch et al. | ....... 180/206.1 |
| 5,237,263 A | | 8/1993 | Gannon | |
| 5,489,002 A | * | 2/1996 | Streiff | ............ 180/65.31 |
| RE37,583 E | * | 3/2002 | Mayer et al. | .............. 180/220 |
| 2005/0177285 A1 | * | 8/2005 | Honda | ................... 701/22 |
| 2007/0251738 A1 | * | 11/2007 | Wachendorf et al. | ........ 180/65.1 |
| 2010/0096198 A1 | | 4/2010 | Liao | |
| 2010/0206652 A1 | * | 8/2010 | Kielland | ................ 180/220 |

FOREIGN PATENT DOCUMENTS

| | | | |
|---|---|---|---|
| CA | 2 310 974 | * | 5/2002 |
| CN | 2936891 Y | | 8/2007 |
| CN | 201392867 Y | | 1/2010 |
| EP | 0 716 009 A2 | | 6/1996 |
| EP | 1 097 863 A2 | | 5/2001 |
| JP | A-5-319104 | | 12/1993 |
| JP | A-8-207877 | | 8/1996 |
| JP | A-10-119853 | | 5/1998 |
| NL | 2000965 C1 | | 12/2008 |
| WO | WO 93/17904 A1 | | 9/1993 |

OTHER PUBLICATIONS

Extended Search Report issued in European Application No. EP 11 16 4081.9 dated Jun. 29, 2011.

* cited by examiner

*Primary Examiner* — Tashiana Adams
*Assistant Examiner* — Marlon Arce
(74) *Attorney, Agent, or Firm* — Oliff & Berridge, PLC

(57) ABSTRACT

An electric wheeled apparatus comprises a main body, a drive wheel supported by the main body in a rotatable manner, an electric motor configured to apply torque to the drive wheel, a battery holder configured to removably receive a plurality of battery packs, and a circuit unit configured to electrically connect one or more battery packs attached to the battery holder to the motor regardless of a number of battery packs attached to the battery holder.

6 Claims, 7 Drawing Sheets

ELECTRIC WHEELED APPARATUS POWERED BY BATTERY PACKS

CROSS-REFERENCE TO A RELATED APPLICATIONS

This application claims priority to Japanese Patent Application No. 2010-108484 filed on May 10, 2010, the contents of which are hereby incorporated by reference into the present application.

TECHNICAL FIELD

The present invention relates to an electric wheeled apparatus powered by battery packs. The electric wheeled apparatus includes a variety of wheeled apparatus having an electric motor that applies torque to a wheel. For example, the electric wheeled apparatus includes electric bicycles (electric assist bicycles, hybrid bicycles), electric motorcycles, electric wheelchairs, electric automobiles, hybrid automobiles (which have two kinds of prime movers including an electric motor), various electric work vehicles (e.g., forklifts, floor sweeper), electric ridable toys, electric carrier carts, electric lifters, electric driverless carriers, and electric wirelessly operated toys (i.e. R/C toys). The electric wheeled apparatus includes not only vehicles ridden by people but also vehicles not ridden by people. Furthermore, the electric wheeled apparatus also includes vehicles having endless treads (also known as a crawler track or Caterpillar (registered trademark)) that are driven by wheels.

DESCRIPTION OF RELATED ART

An electric bicycle powered by a battery pack is disclosed in JP 10-119853 A. The electric bicycle comprises a main body, a front wheel and a rear wheel supported by the main body in a rotatable manner, a pedal configured to be worked by a user, a user force transmission configured to transmit force applied to the pedal to the rear wheel, an electric motor configured to apply torque to the rear wheel, and a battery holder configured to receive a battery pack that supplies power to the electric motor. The battery holder is arranged inside a front basket located above the front wheel. With this electric bicycle, the user can easily work the electric bicycle by receiving assisting force from the electric motor.

SUMMARY OF THE INVENTION

A performance of an electric wheeled apparatus powered by a battery pack is heavily dependent on a performance of the battery pack. In other words, the greater the capacity of the battery pack, the longer the maximum range of the electric wheeled apparatus, and the higher the output voltage of the battery pack, the higher the maximum output of the electric wheeled apparatus. Therefore, in order to improve performance, a conventional electric wheeled apparatus adopts a large-size battery pack that has a large number of built-in battery cells. However, such a large-size battery pack leads to an increase in weight of the electric wheeled apparatus, and may cause a decline in energy efficiency thereof.

In light of the problem described above, the present inventor focused on types of usage of an electric wheeled apparatus by users. Many users desire to have an electric wheeled apparatus with a long maximum range and a high maximum output. However, according to a study carried out by the present inventor, it was found that users rarely travel long distances with the electric wheeled apparatus and, on a daily basis, the electric wheeled apparatus is used for traveling short distances. Based on such findings, the present specification provides a technique which enables the use of a plurality of battery packs in the electric wheeled apparatus, and enables the number of battery packs used by the user to be changed based on predetermined types of usage.

An electric wheeled apparatus disclosed in the present specification comprises a main body, a drive wheel supported by the main body in a rotatable manner, an electric motor configured to apply torque to the drive wheel, a battery holder configured to removably receive a plurality of battery packs, and a circuit unit configured to electrically connect one or more battery packs attached to the battery holder to the electric motor regardless of a number of battery packs attached to the battery holder.

According to the configuration described above, the user is able to adjust the number of battery backs to be used based on the predetermined types of usage of the electric wheeled apparatus. For example, when a long distance trip is planned, the user may use a plurality of battery packs. Accordingly, performance of the electric wheeled apparatus such as the maximum range and maximum output can be improved. On the other hand, when a short distance trip is planned, the user may use only one battery pack. Accordingly, the weight of the electric wheeled apparatus is reduced and energy consumption can be reduced. In addition, a plurality of battery packs need no longer be charged after having used the electric wheeled apparatus.

DETAILED DESCRIPTION OF THE INVENTION

Figure 1:
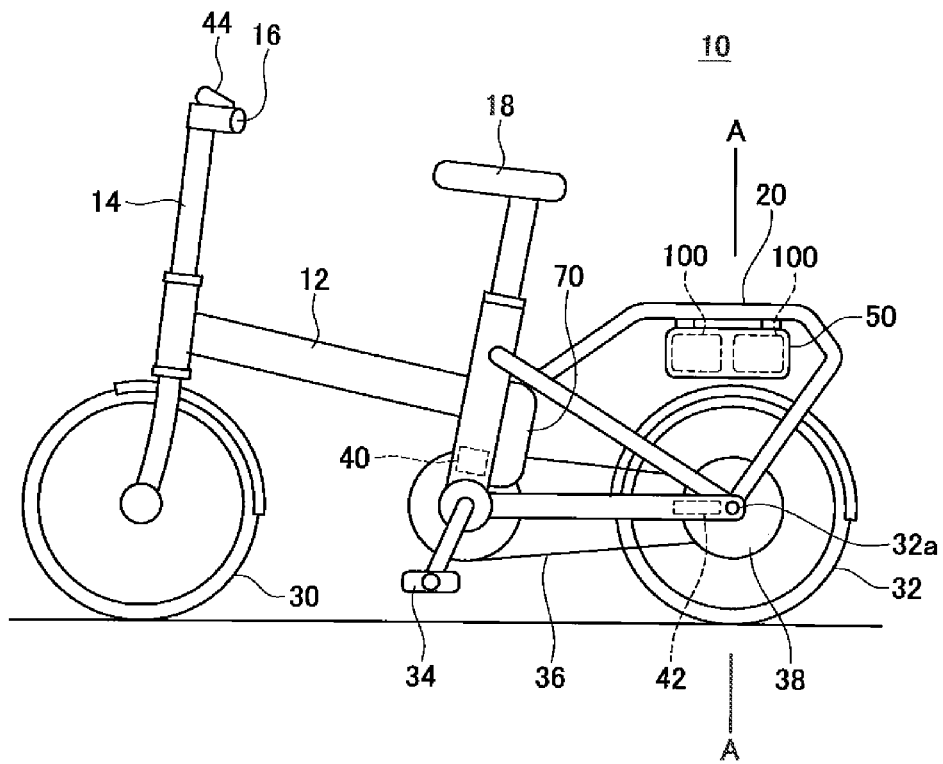
FIG. 1 is a schematic diagram showing an exterior of an electric bicycle.

In an embodiment of an electric wheeled apparatus disclosed herein, favorably, a circuit unit is configured capable of electrically connecting one or more battery packs attached to a battery holder in parallel with an electric motor. According to this configuration, the larger the number of battery packs attached to the battery holder, the greater the power that can be supplied to the electric motor. As a result, the maximum range of the electric wheeled apparatus can be increased. In addition, even if some of the battery packs run out, the other battery packs can continue supplying power to the electric motor.

In an embodiment of the electric wheeled apparatus disclosed herein, favorably, the circuit unit is configured capable of electrically connecting the one or more battery packs attached to the battery holder in series with the electric motor. According to this configuration, the larger the number of battery packs attached to the battery holder, the higher the voltage that can be applied to the electric motor. As a result, the maximum output of the electric wheeled apparatus can be increased.

In an embodiment of the electric wheeled apparatus disclosed herein, favorably, the circuit unit is configured capable of selectively forming: a parallel circuit that electrically connects the one or more battery packs attached to the battery holder in parallel with the electric motor, and a series circuit that electrically connects the one or more battery packs attached to the battery holder in series with the electric motor. According to this configuration, parallel connection and series connection can be selectively used according to, for example, a situation or a purpose of usage of the electric wheeled apparatus.

In an embodiment of the electric wheeled apparatus disclosed herein, favorably, the circuit unit comprises an electric element that prevents reverse current to the one or more battery packs attached to the battery holder. According to this configuration, even when a difference in output voltage occurs among the plurality of battery packs, the reverse current can be prevented from flowing to the battery packs.

In an embodiment of the electric wheeled apparatus disclosed herein, favorably, the battery holder is at least partly arranged above a drive wheel. In addition, more favorably, when the battery holder receives the plurality of battery packs, a center of gravity of at least one battery pack is located at one side relative to a vertical plane which includes a rotational axis of the drive wheel and a center of gravity of another at least one battery pack is located at the other side relative to the vertical plane. In this configuration, the weight of the battery packs is mainly loaded onto the drive wheel. As a result, a contact pressure of the drive wheel to the ground increases, which enables the drive wheel to firmly grip the ground. An increased gripping force of the drive wheel prevents, for example, the drive wheel from skidding and suppresses energy consumption by the electric motor. Moreover, in the conventional electric bicycle described earlier, the battery pack is arranged above a front wheel that is a driven wheel (refer to JP 10-119853 A). In such a configuration, the weight of the battery pack is hardly loaded onto the rear wheel that is the drive wheel. As a result, the weight of the battery pack cannot be utilized to increase the gripping force of the rear wheel.

In the embodiments described above, favorably, the electric wheeled apparatus further comprises a carrier arranged above the drive wheel. In this case, the battery holder is favorably arranged between the drive wheel and the carrier. In this configuration, the gripping force of the drive wheel to the ground can be increased by both the weight of the battery pack and the weight of baggage loaded on the carrier. Furthermore, when the battery holder is arranged below the carrier, the weight of the battery pack enables a center of gravity of the electric wheeled apparatus to be relatively lowered.

In an embodiment of the electric wheeled apparatus disclosed herein, favorably, the battery holder comprises a plurality of battery interfaces each configured to removably receive one battery pack. In this case, favorably, each battery interface comprises: a locking portion configured to engage with and disengage from the attached battery pack, and a biasing member configured to bias the attached battery pack to be taken off. In this configuration, when the user disengages the locking portion, the biasing member moves the battery pack so as to take the battery pack off. Accordingly, the user is able to readily take the battery pack off from the battery holder.

In an embodiment of the electric wheeled apparatus disclosed herein, the electric wheeled apparatus can be configured as an electric bicycle (also referred to as an electric assist bicycle) by further comprising: a pedal configured to be worked by a user on the electric wheeled apparatus; and a user force transmission configured to transmit force applied to the pedal to the drive wheel or another wheel. In this case, the electric bicycle is not limited to a two-wheel vehicle and may be a unicycle or a tricycle. The number of wheels of the electric bicycle is nonrestrictive.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved electric wheeled apparatuses.

Moreover, combinations of features and steps disclosed in the following detail description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiment

An electric bicycle 10 according to an embodiment will be described with reference to the drawings. FIG. 1 is a schematic diagram showing the electric bicycle 10. As shown in FIG. 1, the electric bicycle 10 comprises a main frame 12, a steering column 14, a carrier 20, a front wheel 30, and a rear wheel 32. The steering column 14 is attached to a front end of the main frame 12 in a rotatable manner. The main frame 12 and the steering column 14 constitute a main body of the electric bicycle 10. The front wheel 30 is attached to a lower end of the steering column 14 in a rotatable manner. The rear wheel 32 is attached to a rear end of the main frame 12 in a rotatable manner. The carrier 20 is fixed to the main frame 12 and is located above the rear wheel 32. Baggage can be loaded onto the carrier 20.

The electric bicycle 10 comprises a handle 16 to be gripped by a user, a saddle 18 on which the user is to sit, and a pedal 34 to be worked by the user's foot. The handle 16 is fixed to the steering column 14. The saddle 18 is fixed to the main frame 12. The pedal 34 is attached to the main frame 12 in a rotatable manner. The pedal 34 is connected to the rear wheel 32 via a chain 36. A force (torque) applied to the pedal 34 by the user is transmitted to the rear wheel 32 via the chain 36. In other words, the electric bicycle 10 moves forward as the user works the pedal 34.

Figure 2:
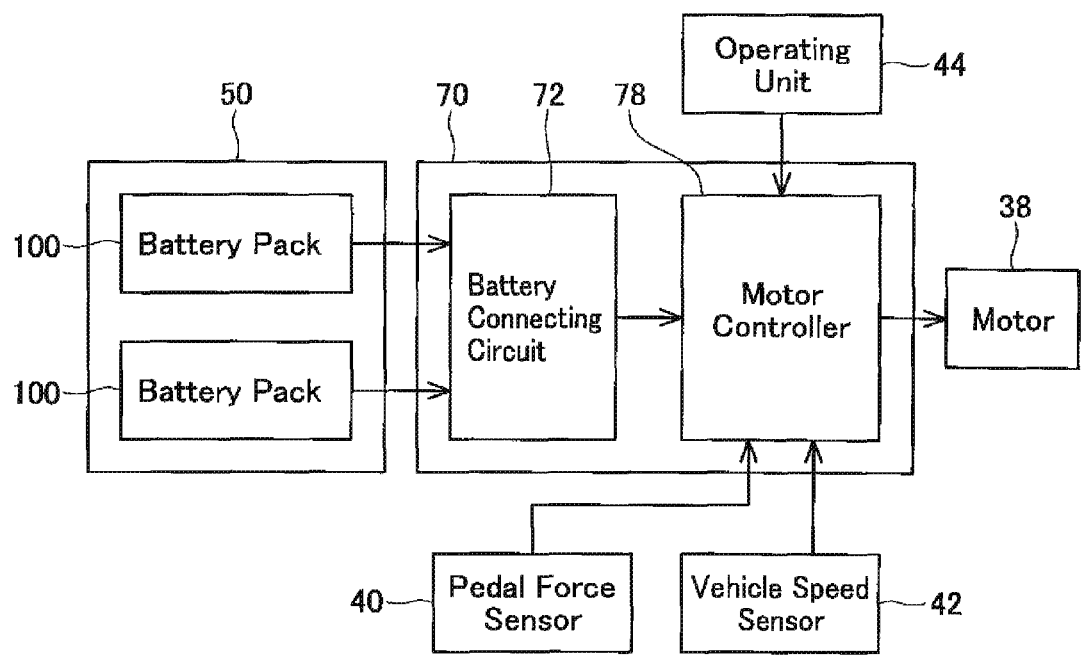
FIG. 2 is a block diagram showing an electric configuration of the electric bicycle.

FIG. 2 is a block diagram showing an electric configuration of the electric bicycle 10. As shown in FIGS. 1 and 2, the electric bicycle 10 comprises an electric motor 38, a battery holder 50, and a circuit unit 70. The electric motor 38 is a prime mover that applies torque to the rear wheel 32. The electric motor 38 is an in-wheel motor (also referred to as a hub motor) and is built into a hub of the rear wheel 32. The electric motor 38 is powered by a battery pack 100 attached to the battery holder 50. Up to two battery packs 100 can be attached to the battery holder 50. The battery pack 100 attached to the battery holder 50 is electrically connected to the electric motor 38 via the circuit unit 70.

The battery pack 100 is originally intended as a battery pack for an electric power tool. In other words, the electric bicycle 10 does not require a dedicated battery pack; instead, a battery pack for an electric power tool can be used. Accordingly, the user can use the battery pack 100 not only for the electric bicycle 10 but also for the electric power tool. Therefore, if the user already owns the electric power tool, the user need not newly purchase the battery pack 100 when purchasing the electric bicycle 10.

The electric bicycle 10 further comprises a pedal force sensor 40, a vehicle speed sensor 42, and an operating unit 44. The pedal force sensor 40 is a sensor for detecting the force (torque) applied to the pedal 34 by the user. The vehicle speed sensor 42 is a sensor for detecting a speed of the electric bicycle 10. The operating unit 44 is a user interface to be operated by the user. By operating the operating unit 44, the user can activate the electric bicycle 10 or switch among modes of the electric bicycle 10. The pedal force sensor 40, the vehicle speed sensor 42, and the operating unit 44 are respectively connected to the circuit unit 70.

As shown in FIG. 2, the circuit unit 70 comprises a battery connecting circuit 72 and a motor controller 78. The battery connecting circuit 72 electrically connects two battery packs 100 to the motor controller 78. The motor controller 78 adjusts the torque applied by the electric motor 38 to the rear wheel 32 by adjusting power supplied from the battery packs 100 to the electric motor 38. In this case, the motor controller 78 determines the torque applied by the electric motor 38 to the rear wheel 32 based on detected values of the pedal force sensor 40 and the vehicle speed sensor 42. In other words, the torque applied by the electric motor 38 to the rear wheel 32 is adjusted according to the force (torque) applied to the pedal 34 by the user and the speed of the electric bicycle 10. For example, the greater the force applied to the pedal 34 by the user, the greater the torque to be applied to the rear wheel 32 by the electric motor 38. Accordingly, the user can easily work the pedal 34 even when starting or climbing. In addition, the greater the speed of the electric bicycle 10, the smaller the torque to be applied to the rear wheel 32 by the electric motor 38. Accordingly, excessive speeding of the electric bicycle 10 can be prevented.

Figure 3:
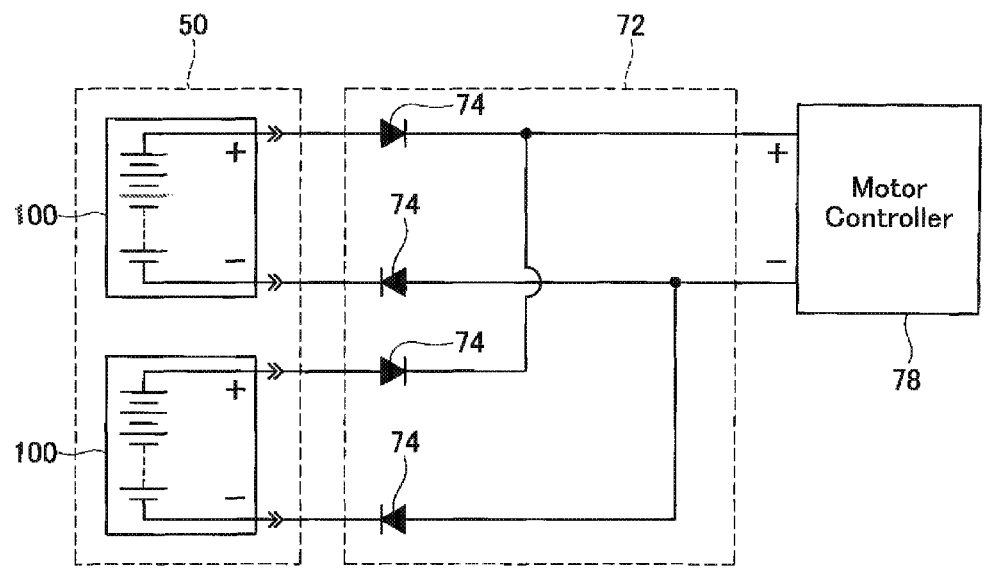
FIG. 3 shows a circuit structure of a battery connecting circuit to which two battery packs have been attached.
Figure 4:
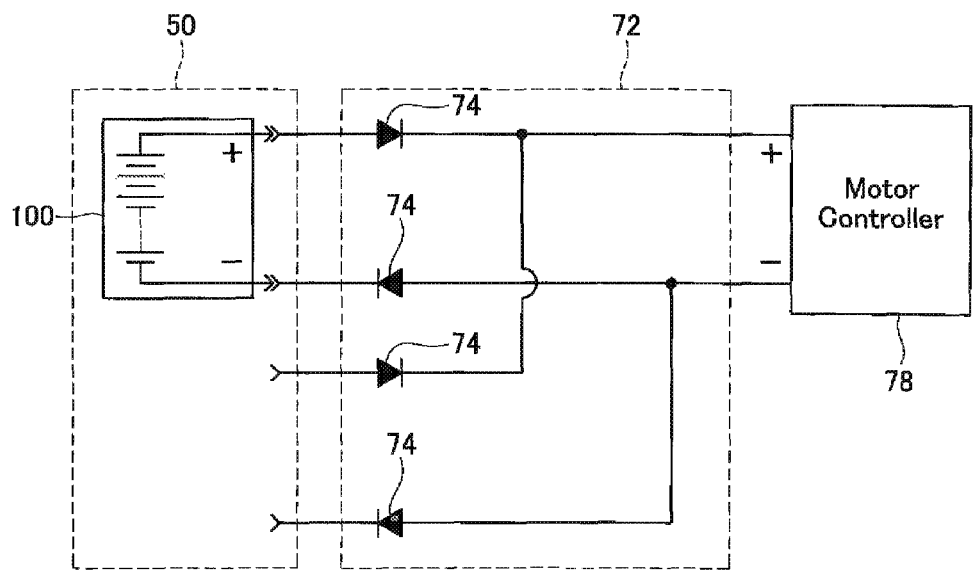
FIG. 4 shows the circuit structure of the battery connecting circuit to which one battery pack has been attached.

FIG. 3 shows a circuit structure of the battery connecting circuit 72. As shown in FIG. 3, the battery connecting circuit 72 is a parallel circuit in which two battery packs 100 attached to the battery holder 50 are connected in parallel. Since the battery connecting circuit 72 is a parallel circuit, two battery packs 100 need not necessarily be attached to the battery holder 50. As shown in FIG. 4, the user may only attach one battery pack 100 to the battery holder 50. Even in this case, the battery connecting circuit 72 can electrically connect the single battery pack 100 to the motor controller 78 (in other words, the electric motor 38). As a result, the user is able to adjust the number of battery backs 100 to be used based on predetermined types of usage of the electric bicycle 10. For example, when a long distance trip by the electric bicycle 10 is planned, the user can extend the maximum range of the electric bicycle 10 by using two battery packs 100. On the other hand, when a short distance trip by the electric bicycle 10 is planned, the user can reduce the weight of the electric bicycle 10 by using only one battery pack 100. By reducing the weight of the electric bicycle 10, energy consumption by the electric motor 38 can be suppressed.

As shown in FIGS. 3 and 4, the battery connecting circuit 72 comprises a plurality of diodes 74. The plurality of diodes 74 is rectifying elements that prevent a reverse current from flowing to the battery pack 100. According to this configuration, even when a difference in output voltage occurs between the two battery packs 100, the reverse current can be prevented from flowing to the low-voltage battery pack 100. As a result, for example, the electric bicycle 10 can keep running even if one of the battery packs 100 runs out. The battery pack 100 that has run out need not be taken off from the battery holder 50.

Next, an arrangement of the battery holder 50 will be described. As shown in FIG. 1, the battery holder 50 is arranged above a rotational axis 32a of the rear wheel 32. Particularly, in the present embodiment, when two battery packs 100 are attached to the battery holder 50, a center of gravity of one of the battery packs 100 is located on a front side relative to a vertical plane A which includes the rotational axis 32a of the rear wheel 32, and a center of gravity of the other battery pack 100 is located on a rear side relative to the vertical plane A. According to such a configuration, the weight of two battery packs 100 is mainly loaded on the rear wheel 32. As a result, a contact pressure of the rear wheel 32 to the ground increases and enables the rear wheel 32 to firmly grip the ground. In this case, the rear wheel 32 is a drive wheel to which the torque from the electric motor 38 is applied. An increased gripping force of the rear wheel 32 that is a drive wheel prevents the rear wheel 32 from skidding and suppresses the energy consumption by the electric motor 38.

Furthermore, in the electric bicycle 10 according to the present embodiment, the carrier 20 is provided above the rear wheel 32, and the battery holder 50 is arranged between the rear wheel 32 and the carrier 20. According to this configuration, in addition to the weight of the battery packs 100, the gripping force of the rear wheel 32 to the ground can also be increased by the weight of baggage loaded on the carrier 20. In addition, since the battery holder 50 is arranged below the carrier 20, the weight of the battery pack 100 enables a center of gravity of the electric bicycle 10 to be relatively lowered.

Figure 5:
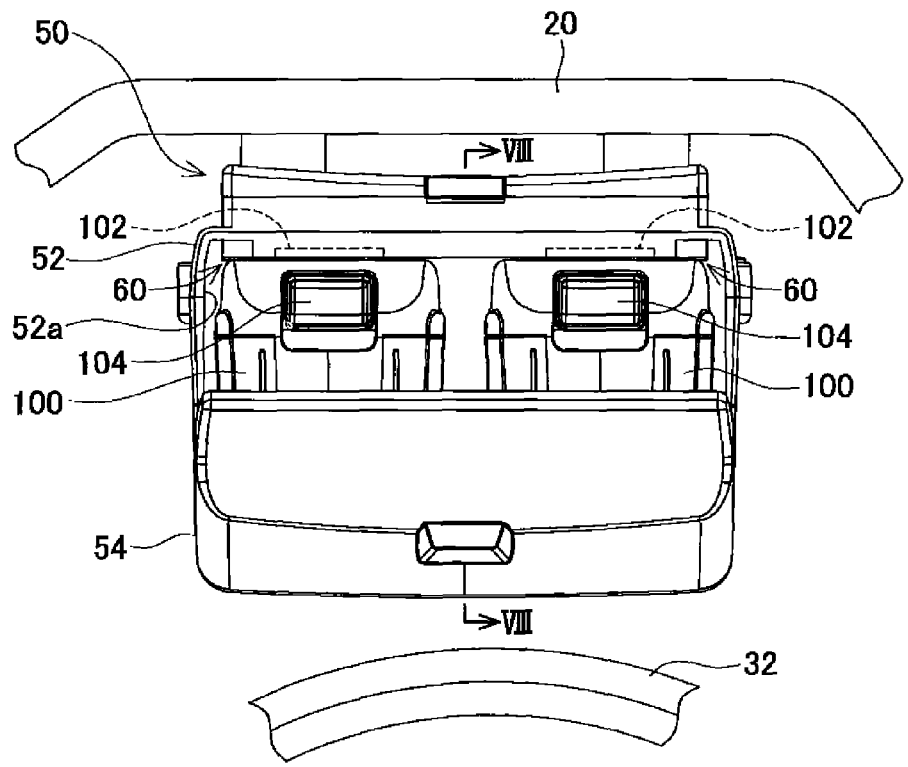
FIG. 5 is a front view showing a battery holder in an open state.
Figure 6:
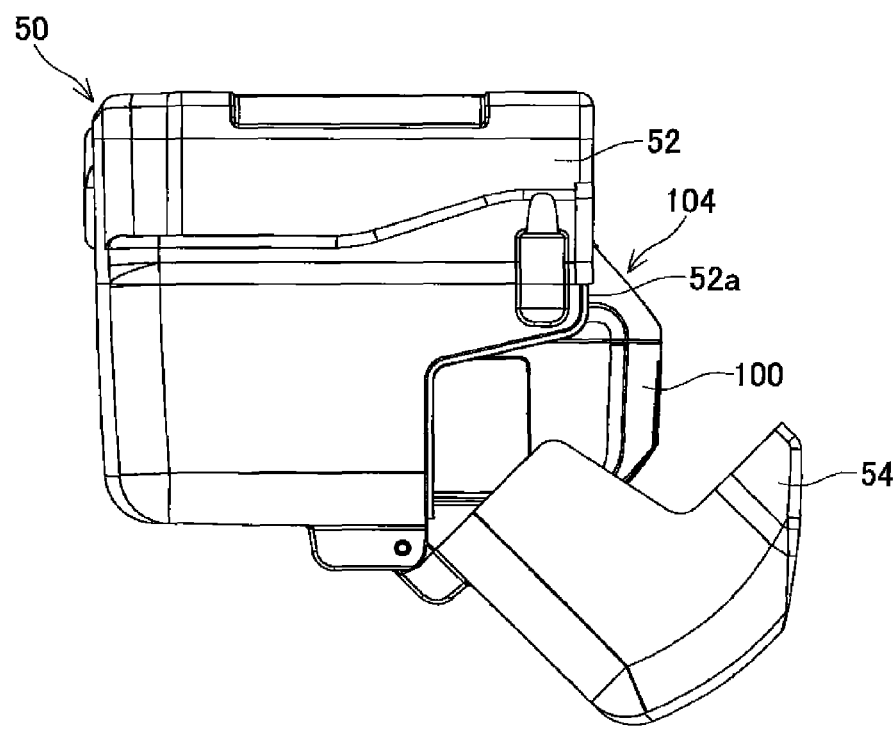
FIG. 6 is a side view showing the battery holder in the open state.
Figure 7:
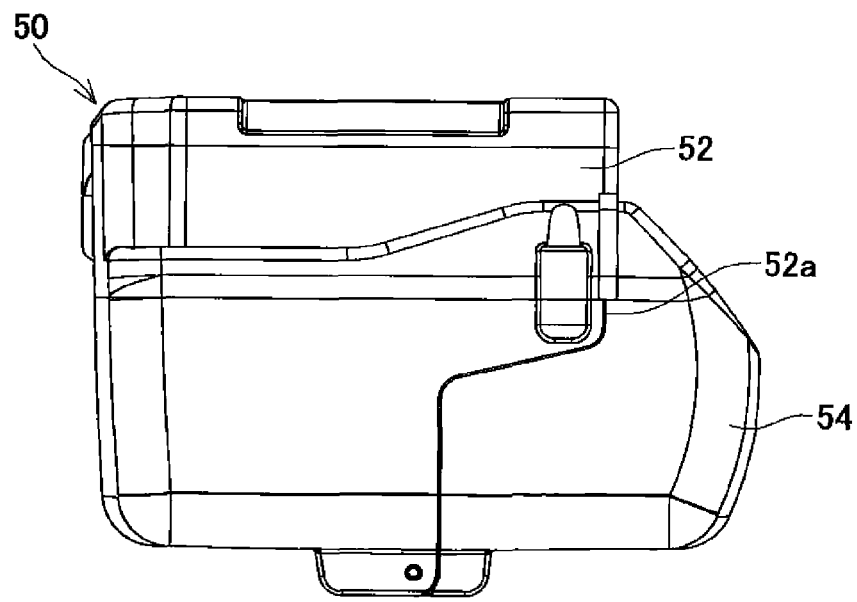
FIG. 7 is a side view showing the battery holder in a closed state.
Figure 8:
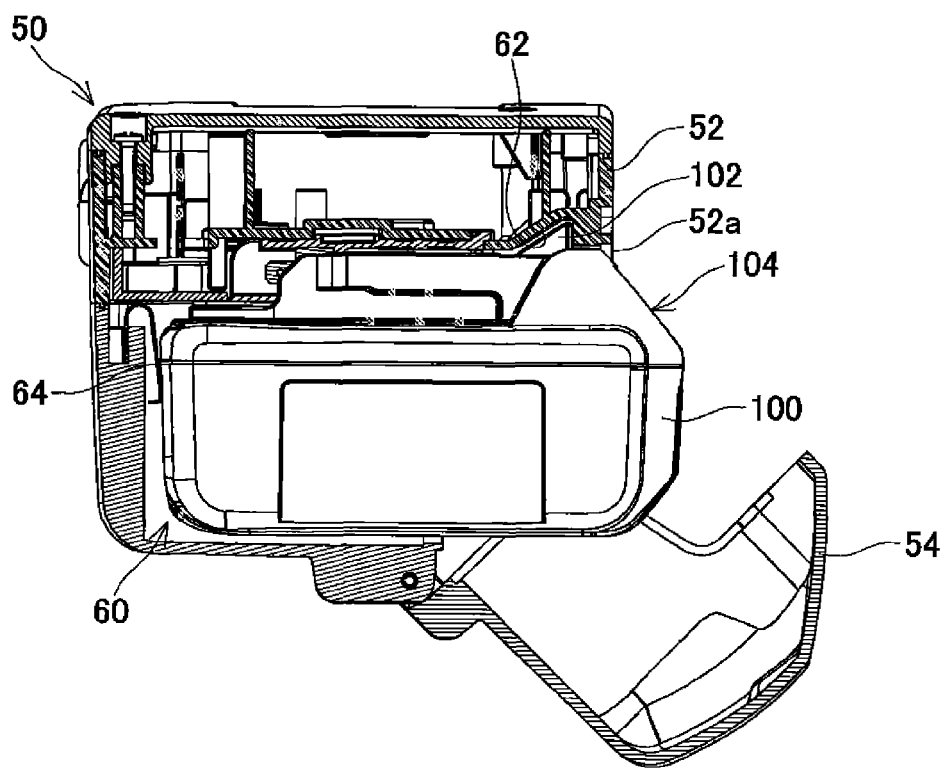
FIG. 8 is a cross-sectional view taken along VIII-VIII in FIG. 5.

Next, a structure of the battery holder 50 will be described. FIG. 5 is a front view of the battery holder 50 and FIGS. 6 and 7 are side views of the battery holder 50. FIG. 8 shows a cross-sectional view taken along VIII-VIII in FIG. 5. The front of the battery holder 50 faces a side of the electric bicycle 10. In addition, FIGS. 5, 6, and 8 show the battery holder 50 in an open state and FIG. 7 shows the battery holder 50 in a closed state. Normally, the electric bicycle 10 is used in a state where the battery holder 50 is closed.

The battery holder 50 comprises a casing 52 and a cover 54 that blocks an opening 52a of the casing 52. The casing 52 is capable of housing two battery packs 100. The two battery packs 100 are put in and taken out from the opening 52a of the casing 52. Two battery interfaces 60 are provided inside the casing 52. Each battery interface 60 is configured to removably receive one of the battery packs 100. The two battery interfaces 60 are aligned along the opening 52a of the casing 52. Therefore, the battery pack 100 can be independently attached and removed at each battery interface 60. In other words, while keeping one of the battery packs 100 attached, the other battery pack 100 can be attached or removed. As shown in FIG. 7, when the cover 54 is closed, the battery holder 50 completely houses the two battery packs 100.

The battery pack 100 is provided with a movable hook 102 and a release button 104. The movable hook 102 is biased so as to protrude toward the battery pack 100. The release button 104 is integrally formed with the movable hook 102, and by pressing the release button 104, the movable hook 102 is pressed down. The movable hook 102 is originally a lock member which engages the electric power tool to lock the battery pack 100 to the electric power tool. On the other hand, a hook engagement hole 62 and a spring member 64 are provided at each battery interface 60. An opening of the hook engagement hole 62 faces the battery pack 100. The spring member 64 is provided at a position abutting the battery pack 100. When the battery pack 100 is attached to the battery interface 60, the movable hook 102 engages the hook engagement hole 62. Consequently, the battery pack 100 is locked to the battery interface 60. At this point, the spring member 64 is compressed by the battery pack 100 and biases the battery pack 100 toward the opening 52a of the casing 52. In other words, the battery pack 100 is biased in a removing direction thereof by the spring member 64.

Figure 9:
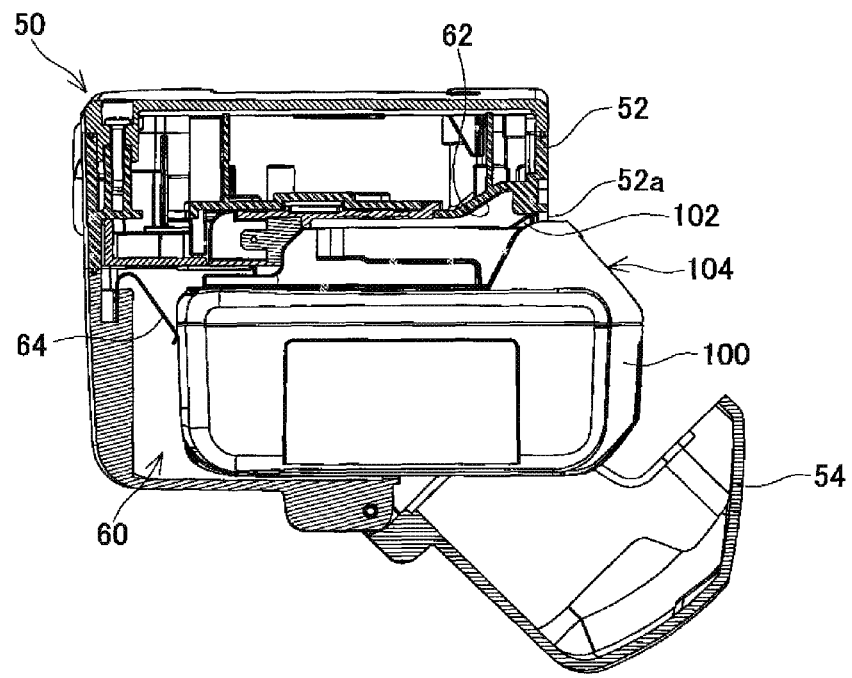
FIG. 9 shows the battery pack pushed out by a spring member.

When removing the battery pack 100 from the battery holder 50, the user opens the cover 54 and presses the release button 104 of the battery pack 100. As shown in FIG. 9, when the release button 104 of the battery pack 100 is pressed, the movable hook 102 of the battery pack 100 disengages from the hook engagement hole 62 of the battery interface 60. Accordingly, the lock of the battery pack 100 is released. When the lock of the battery pack 100 is released, the battery pack 100 moves toward the opening 52a of the casing 52 due to a biasing force of the spring member 64. As a result, the battery pack 100 protrudes greatly from the opening 52a of the casing 52. The user can easily remove the battery pack 100 without having to place a finger inside the casing 52. Since there is no need to secure a space between the casing 52 and the battery pack 100 for the user to place a finger, the casing 52 can be designed in a compact manner.

As described above, a first feature of the electric bicycle 10 according to the present embodiment is that the battery holder 50 is configured to removably receive two battery packs 100 and the circuit unit 70 is configured to electrically connect one or more battery packs 100 attached to the battery holder 50 to the electric motor 38 regardless of the number of battery packs 100 attached to the battery holder 50. Due to this configuration, the user is able to adjust the number of battery backs 100 to be used based on predetermined types of usage of the electric bicycle 10. Alternatively, the total number of battery packs is not restricted to two. The battery holder 50 may be configured to removably receive three or more battery packs by configuring the battery connecting circuit 72 to receive all of the battery packs.

In addition, a second feature of the electric bicycle 10 according to the present embodiment is that the battery holder 50 is arranged above the rear wheel 32 that is the drive wheel (more specifically, above the rotational axis 32a of the rear wheel 32). In addition, when two battery packs 100 are attached to the battery holder 50, the center of gravity of one of the battery packs 100 is located on the front side relative to the vertical plane A which includes the rotational axis 32a of the rear wheel 32, and the center of gravity of the other battery pack 100 is located on the rear side relative to the vertical plane A. According to this configuration, the weight of the two battery packs 100 is mainly loaded on the rear wheel 32 and the gripping force of the rear wheel 32 can be increased. The increased gripping force of the rear wheel 32 enables energy consumption by the electric motor 38 to be suppressed. Alternatively, in the case where more than two batteries are used, the above-mentioned benefit of increasing the gripping force of the rear wheel 32 can be obtained so long as the center of gravity of at least one of the battery packs is located on the front side relative to the vertical plane A, and the center of gravity of at least another one battery pack is located on the rear side relative to the vertical plane A. A symmetric arrangement of the battery packs relative to the vertical plane A is favorable.

Furthermore, a third feature of the electric bicycle 10 according to the present embodiment is that each battery interface 60 of the battery holder 50 comprises the hook engagement hole 62 configured to engage with and disengage from the attached battery pack 100, and the spring member 64 configured to bias the attached battery pack 100 in the removing direction. Due to this configuration, when the user releases the engagement by the hook engagement hole 62, the spring member 64 moves the battery pack 100 in a removing direction thereof. Accordingly, the user is able to readily take off the battery pack 100 from the battery holder 50.

Figure 10:
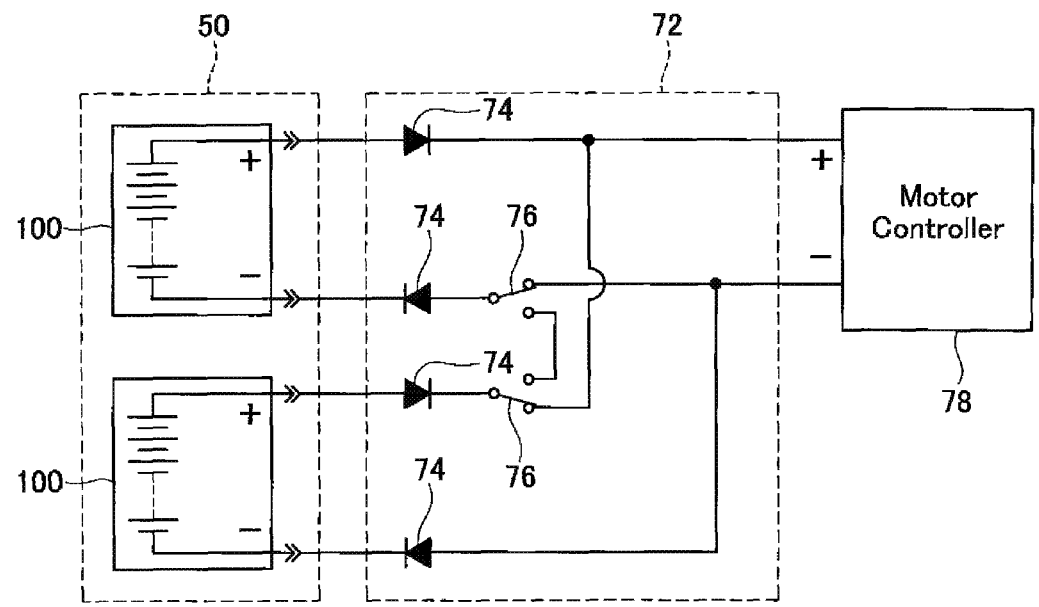
FIG. 10 is a diagram showing a modification of the battery connecting circuit (in a state of parallel connection).
Figure 11:
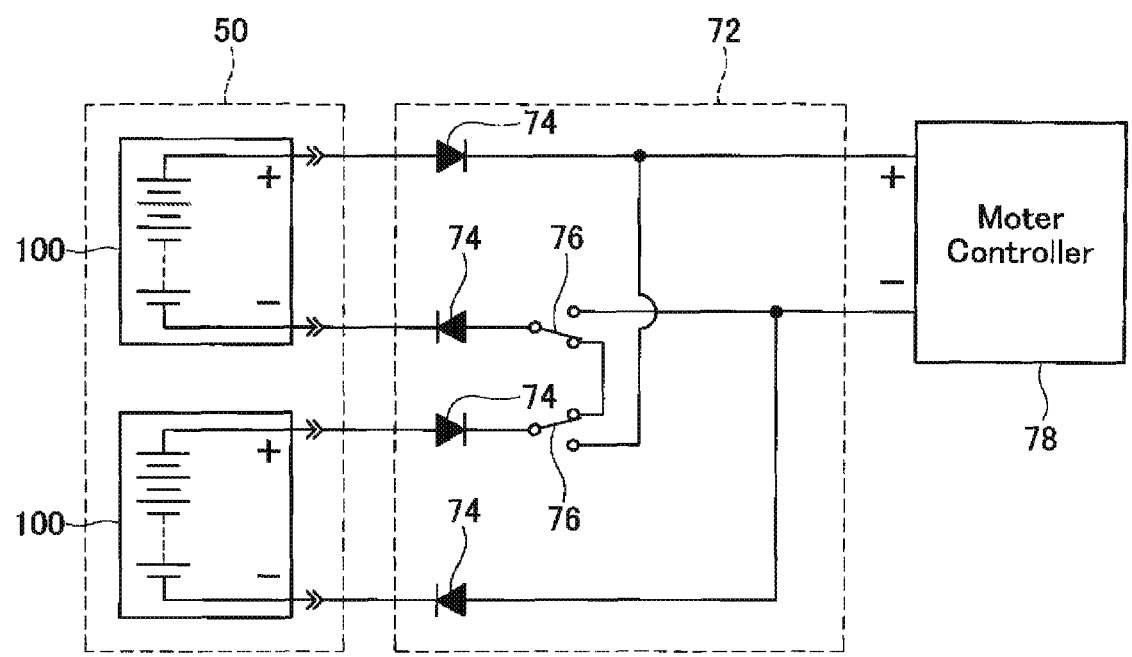
FIG. 11 is a diagram showing a modification of the battery connecting circuit (in a state of series connection).

In the electric bicycle 10 described above, the battery connecting circuit 72 may be a series circuit in which two battery packs 100 are connected in series. Alternatively, as shown in FIGS. 10 and 11, the battery connecting circuit 72 can be configured to further comprise a plurality of switching circuits 76 and to be capable of changing the connection state of the two battery packs 100. In other words, by switching between the plurality of switching circuits 76, the battery connecting circuit 72 can either connect the two battery packs 100 in parallel (refer to FIG. 10) or connect the two battery packs 100 in series (refer to FIG. 11). According to the battery connecting circuit 72, a maximum range of the electric bicycle 10 can be increased by connecting the two battery packs 100 in parallel, and a maximum output of the electric bicycle 10 can be increased by connecting the two battery packs 100 in series. For example, a configuration can be adopted in which one of a "long distance mode" and a "high output mode" can be selected, the two battery packs 100 are connected in parallel when the "long distance mode" is selected, and the two battery packs 100 are connected in series when the "high output mode" is selected.

The technique described in the embodiment is not limited to the electric bicycle 10 and can be similarly applied to electric wheeled apparatuses of other types. In other words, the technique described in the embodiment can be widely adopted in regards to various apparatuses which are powered by battery packs and in which torque is applied to a wheel by an electric motor. For example, the electric wheeled apparatus may further include electric motorcycles, electric wheelchairs, electric automobiles, hybrid automobiles (which have two kinds of prime movers including an electric motor), various electric work vehicles (e.g., forklifts, floor sweeper), electric ridable toys, electric carrier carts, electric lifters, electric driverless carriers, and electric wirelessly operated toys (i.e. R/C toys). In these cases, the number of wheels, the number of electric motors, whether or not a person is on-board, and a presence of another prime mover (whether or not an apparatus is a hybrid) are not restrictive. The configuration and effects thereof as in the above embodiment can similarly be achieved even in cases where the electric wheeled apparatus includes two, coaxial drive wheels. Further, the electric wheeled apparatus may not include any driven wheel.

What is claimed is:

1. An electric wheeled apparatus that, at least in part, functionally cooperates with an electric power tool, the electric wheeled apparatus comprising:
   a main body;
   a drive wheel supported by the main body in a rotatable manner;
   an electric motor configured to apply torque to the drive wheel;
   at least one battery pack that is configured to operate as a power source of the electric power tool;
   a battery holder configured to removably receive the at least one battery pack; and
   a circuit unit configured to electrically connect one or more battery packs attached to the battery holder to the motor,
   wherein the circuit unit is configured to electrically connect the one or more battery packs attached to the battery holder in parallel with the electric motor.

2. The electric wheeled apparatus as in claim 1, wherein the circuit unit is configured to selectively form:
   a parallel circuit that electrically connects the one or more battery packs attached to the battery holder in parallel with the electric motor, and
   a series circuit that electrically connects the one or more battery packs attached to the battery holder in series with the electric motor.

3. An electric wheeled apparatus that, at least in part, functionally cooperates with an electric power tool, the electric wheeled apparatus comprising:
   a main body;
   a drive wheel supported by the main body in a rotatable manner;
   an electric motor configured to apply torque to the drive wheel;
   at least one battery pack that is configured to operate as a power source of the electric power tool;
   a battery holder configured to removably receive the at least one battery pack; and
   a circuit unit configured to electrically connect one or more battery packs attached to the battery holder to the motor,
   wherein the circuit unit includes an electric element that prevents reverse current to the one or more battery packs attached to the battery holder.

4. An electric wheeled apparatus that, at least in part, functionally cooperates with an electric power tool, the electric wheeled apparatus comprising:
   a main body;
   a drive wheel supported by the main body in a rotatable manner;
   an electric motor configured to apply torque to the drive wheel;
   at least one battery pack that is configured to operate as a power source of the electric power tool;
   a battery holder configured, to removably receive the at least one battery pack; and
   a circuit unit configured to electrically connect one or more battery packs attached to the battery holder to the motor,
   wherein the battery holder is configured to receive a plurality of battery packs such that:
   a center of gravity of at least one battery pack is located at a front side relative to a rotational axis of the drive wheel, and
   a center of gravity of another at least one battery pack is located at a rear side relative to the rotational axis.

5. An electric wheeled apparatus that, at least in part, functionally cooperates with an electric power tool, the electric wheeled apparatus comprising:
   a main body;
   a drive wheel supported by the main body in a rotatable manner;
   an electric motor configured to apply torque to the drive wheel;
   at least one battery pack that is configured to operate as a power source of the electric power tool;
   a battery holder configured to removably receive the at least one battery pad; and
   a circuit unit configured to electrically connect one or more battery packs attached to the battery holder to the motor,
   a carrier arranged above the drive wheel, wherein
   the battery holder is configured to receive the at least one battery pack such that the at least one battery pack is wholly located above a top of the drive wheel and below the carrier.

6. An electric wheeled apparatus that, at least in part, functionally cooperates with an electric power tool, the electric wheeled apparatus comprising:
   a main body;
   a drive wheel supported by the main body in a rotatable manner;
   an electric motor configured to apply torque to the drive wheel;
   at least one battery pack that is configured to operate as a power source of the electric power tool;
   a battery holder configured to removably receive the at least one battery pack; and
   a circuit unit configured to electrically connect one or more battery packs attached to the battery holder to the motor,
   wherein
   the battery holder includes at least one battery interface configured to removably receive one battery pack, and
   the battery interface includes:
      a locking portion configured to engage with the attached battery pack and to disengage from the attached battery pack, and
      a biasing member configured to bias the attached battery pack to be taken off.

* * * * *